(12) United States Patent
Lee et al.

(10) Patent No.: US 10,742,075 B2
(45) Date of Patent: Aug. 11, 2020

(54) WIRELESS CHARGING METHOD AND ELECTRONIC DEVICE SUPPORTING SAME

(71) Applicant: Samsung Electronics Co., Ltd., Gyeonggi-do (KR)

(72) Inventors: Wooram Lee, Gyeonggi-do (KR); Kyoungwon Kim, Gyeonggi-do (KR); Seho Park, Gyeonggi-do (KR); Chang-Hak O, Gyeonggi-do (KR); Kyeongjun Kim, Gyeonggi-do (KR); Kihyun Kim, Gyeonggi-do (KR); Yunjeong Noh, Gyeonggi-do (KR); Jae-Wan Park, Gyeonggi-do (KR); Hyungkoo Chung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 430 days.

(21) Appl. No.: 15/823,889

(22) Filed: Nov. 28, 2017

(65) Prior Publication Data

US 2018/0152058 A1    May 31, 2018

(30) Foreign Application Priority Data

Nov. 29, 2016 (KR) .......................... 10-2016-0160105

(51) Int. Cl.
*H02J 7/00*         (2006.01)
*H02J 50/70*        (2016.01)
(Continued)

(52) U.S. Cl.
CPC .............. *H02J 50/70* (2016.02); *H02J 7/025* (2013.01); *H02J 50/12* (2016.02); *H02J 50/80* (2016.02); *H02M 7/5387* (2013.01)

(58) Field of Classification Search
CPC ...................................................... H02J 50/70
(Continued)

(56) References Cited

U.S. PATENT DOCUMENTS

| 2008/0129215 | A1* | 6/2008 | Boys | ........................ | H02J 50/40 |
| | | | | | 315/209 R |
| 2010/0127660 | A1* | 5/2010 | Cook | ...................... | H01Q 1/248 |
| | | | | | 320/108 |

(Continued)

FOREIGN PATENT DOCUMENTS

| KR | 10-2014-0099741 A | 8/2014 |
| WO | 2014/167207 A1 | 10/2014 |

OTHER PUBLICATIONS

European Search Report dated Jun. 13, 2018.

*Primary Examiner* — Yalkew Fantu
(74) *Attorney, Agent, or Firm* — Cha & Reiter, LLC.

(57) ABSTRACT

An electronic device according to one embodiment of the present disclosure includes a conductive coil, a power generation circuit, and one or more processors operatively connected to the power generation circuit and may be configured to: compare an amount of transmission power to be supplied to a power reception device with designated threshold power amount, determine a designated frequency to be a frequency of a control signal for controlling the power generation circuit when the amount of transmission power is equal to or less than the designated threshold power amount, determine a phase of the control signal based at least in part on the amount of transmission power and/or the designated frequency when the designated frequency is determined to be the frequency of the control signal, transmit the control signal having the designated frequency and the phase to the power generation circuit to generate, based at least in part on the control signal, transmission power corresponding to the amount of transmission power, and (Continued)

supply the transmission power generated by the power generation circuit to the power reception device wirelessly via the conductive coil.

19 Claims, 15 Drawing Sheets

(51) Int. Cl.
*H02J 50/80* (2016.01)
*H02J 50/12* (2016.01)
*H02J 7/02* (2016.01)
*H02M 7/5387* (2007.01)

(58) Field of Classification Search
USPC .......................................................... 320/108
See application file for complete search history.

(56) References Cited

U.S. PATENT DOCUMENTS

| | | | |
|---|---|---|---|
| 2013/0026981 A1* | 1/2013 | Van Der Lee | H02J 5/005 |
| | | | 320/108 |
| 2013/0099584 A1 | 4/2013 | Von Novak, III | |
| 2013/0237272 A1* | 9/2013 | Prasad | H04B 7/0617 |
| | | | 455/517 |
| 2014/0111153 A1* | 4/2014 | Kwon | H02J 5/005 |
| | | | 320/108 |
| 2014/0217962 A1 | 8/2014 | Kim et al. | |
| 2015/0270719 A1* | 9/2015 | Kurs | B60L 53/122 |
| | | | 320/108 |
| 2016/0118179 A1 | 4/2016 | Park et al. | |

\* cited by examiner

WIRELESS CHARGING METHOD AND ELECTRONIC DEVICE SUPPORTING SAME

CLAIM OF PRIORITY

This application claims the priority under 35 U.S.C. § 119(a) to Korean Patent Application Serial No. 10-2016-0160105, which was filed in the Korean Intellectual Property Office on Nov. 29, 2016, the entire content of which is hereby incorporated by reference.

TECHNICAL FIELD

The present disclosure generally relates to a wireless charging method and an electronic device supporting the same.

BACKGROUND

Recently, wireless charging techniques have been developed. One type of wireless charging may use electromagnetic induction, while another type may use magnetic resonance. These charging methods have been increasingly utilized in electronic devices such as smart phones. In such systems when the power transmitting unit (PTU) (e.g., a wireless charging pad) and the power receiving unit (PRU) (e.g., a smart phone) come into contact with each other or are within a certain distance of each other, the battery of the power reception device can be charged via electromagnetic induction or electromagnetic resonance between a transmission coil of the power transmission device and a reception coil of the power reception device.

SUMMARY

However, electro-magnetic interference (EMI) may occur during the wireless transmission of power from the power transmission device to the power reception device. Such EMI may cause problems such as malfunctions of the power transmission device and/or the power reception device, may have adverse effects on the human body, etc.

Various embodiments of the present disclosure relate to wireless charging methods which may reduce degradation due to EMI by adjusting the frequency, phase, and/or duty cycle of a control signal for controlling a power generation device, and an electronic device supporting the same.

The technical objectives of the present disclosure are not limited to the above, and other objectives, even if not explicitly disclosed, may be apparent to by those skilled in the art after reading the following description.

An electronic device according to one embodiment of the present disclosure may include: a conductive coil; a power generation circuit; and one or more processors operatively connected to the power generation circuit and may be configured to: compare an amount of transmission power to be supplied to a power reception device with designated threshold power amount, determine a designated frequency to be a frequency of a control signal for controlling the power generation circuit when the amount of transmission power is equal to or less than the designated threshold power amount, determine a phase of the control signal based at least in part on the amount of transmission power and/or the designated frequency when the designated frequency is determined to be the frequency of the control signal, transmit the control signal having the designated frequency and the phase to the power generation circuit to generate, based at least in part on the control signal, transmission power corresponding to the amount of transmission power, and supply the transmission power generated by the power generation circuit to the power reception device wirelessly via the conductive coil.

A wireless charging method according to one embodiment of the present disclosure may include: comparing an amount of transmission power to be supplied to a power reception device with designated threshold power amount; determining a designated frequency to be a frequency of a control signal for controlling a power generation circuit when the amount of transmission power is equal to or less than the designated threshold power amount; determining a phase of the control signal based at least in part on the amount of transmission power and/or the designated frequency when the designated frequency is determined to be the frequency of the control signal; transmitting the control signal having the designated frequency and the phase to the power generation circuit to generate, based at least in part on the control signal, transmission power corresponding to the amount of transmission power; and wirelessly supplying the transmission power generated by the power generation circuit to the power reception device via a conductive coil.

An electronic device according to one embodiment of the present disclosure may include: a conductive coil; a power generation circuit; and one or more processors operatively connected to the power generation circuit and may be configured to: compare an amount of transmission power to be supplied to a power reception device with designated threshold power amount, varying a frequency of a control signal for controlling the power generation circuit within a designated frequency range when the amount of transmission power is equal to or less than the designated threshold power amount, determine at least one of a phase and a duty cycle of the control signal based at least in part on the amount of transmission power and/or the varied frequency, transmit the control signal having at least one of the varied frequency, the determined phase, and the determined duty cycle to the power generation circuit to generate, based at least in part on the control signal, transmission power corresponding to the amount of transmission power, and wirelessly supply the transmission power generated by the power generation circuit to the power reception device via the conductive coil.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
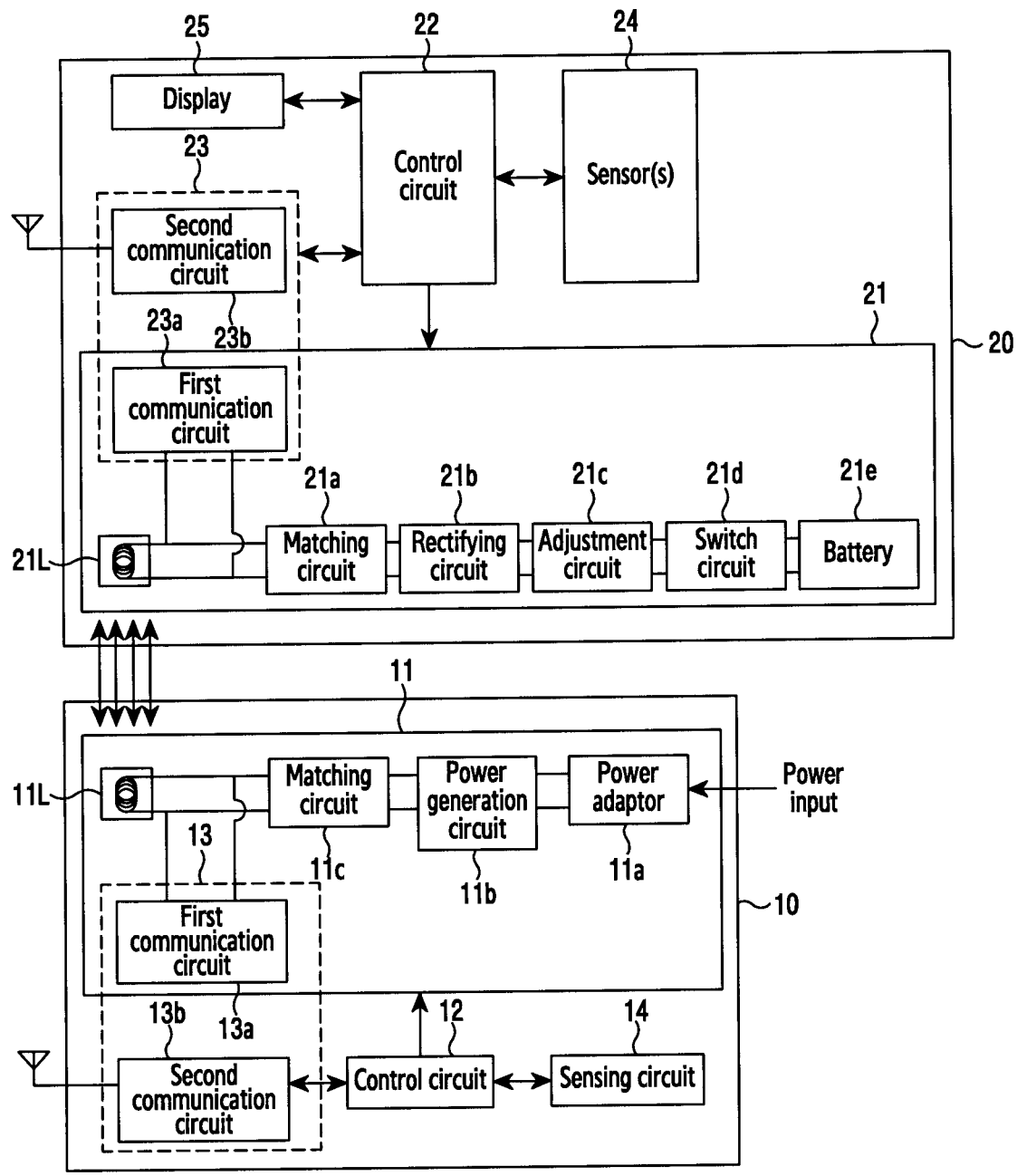
FIG. 1 is a block diagram illustrating a wireless charging system according to one embodiment of the present disclosure.

Hereinafter, various embodiments of the present disclosure will be described with reference to the accompanying drawings. However, it should be understood that there is no intent to limit the present disclosure to the disclosed embodiments, and the present disclosure should be construed to cover all modifications, equivalents, and/or alternatives falling within the spirit and scope of the present disclosure. In describing the drawings, similar reference numerals may be used to designate similar constituent elements.

As used herein, the expression "have," "may have," "include," or "may include" refers to the existence of a corresponding feature (e.g., function, operation, or constituent element such as component), and does not exclude one or more additional features.

In the present disclosure, the expression "A or B," "at least one of A or/and B," or "one or more of A or/and B" may include all possible combinations of the items listed. For example, the expression "A or B," "at least one of A and B,", or "at least one of A or B" may signify (1) at least one A, (2) at least one B, or (3) both at least one A and at least one B.

The expression "a first," "a second," "the first," or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., a first element) is referred to as being (operatively or communicatively) "connected," or "coupled," to another element (e.g., a second element), it may be directly connected or coupled directly to the other element or another element (e.g., a third element) may be between them. In contrast, it may be understood that when an element (e.g., a first element) is referred to as being "directly connected," or "directly coupled" to another element (e.g. a second element), there are no element (e.g., a third element) between them.

As used herein, the expression "configured to" may be interchangeably used with the expression "suitable for," "having the capability to," "designed to," "adapted to," "made to," or "capable of." The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. As used herein, singular forms may include the corresponding plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have excessively formal meanings unless clearly defined in the present disclosure. In some cases, even the term explicitly defined in the present disclosure should not be interpreted to exclude embodiments of the present disclosure.

Electronic devices according to various embodiments of the present disclosure may be, for example, smart phones, tablet Personal Computer (PC)s, mobile phones, video phones, electronic book readers (e-book readers), desktop PCs, laptop PCs, netbook computers, workstations, servers, Personal Digital Assistants (PDAs), Portable Multimedia Players (PMPs), MPEG-1 audio layer-3 (MP3) players, mobile medical devices, cameras, wearable device, etc. The wearable device may be an accessory (e.g., a watch, a ring, a bracelet, an anklet, a necklace, a glasses, a contact lens, or a Head-Mounted Device (HMD)), a device integrated with fabric or clothing (e.g., an electronic clothing), a body-mounted device (e.g., a skin pad, or tattoo), or a bio-implantable device (e.g., an implantable circuit).

According to some embodiments, the electronic device may be a home appliance. The home appliance be, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may be various medical devices (e.g., various portable medical measuring devices (blood glucose monitoring devices, heart rate monitoring devices, blood pressure measuring devices, body temperature measuring devices, etc.), Magnetic Resonance Angiography (MRA) devices, Magnetic Resonance Imaging (MRI) devices, Computed Tomography (CT) machines, ultrasonic machines), navigation devices, Global Positioning System (GPS) receivers, Event Data Recorders (EDRs), Flight Data Recorders (FDRs), Vehicle Infotainment Devices, electronic devices for ships (e.g., navigation devices for ships, gyro-compasses, etc.), avionics, security devices, automotive head units, robots for home or industrial use, Automatic Teller's Machines (ATMs) in banks, Point Of Sales (POS) devices in stores, or Internet of Things (IoT) devices (e.g., light bulbs, various sensors, electric or gas meters, sprinkler devices, fire alarms, thermostats, streetlamps, toasters, sporting goods, hot water tanks, heaters, boilers, etc.).

According to some embodiments, the electronic device may be a part of furniture or a building/structure, an electronic board, an electronic signature receiving device, a projector, and various kinds of measuring instruments (e.g., water meters, electric meters, gas meters, and radio wave meters). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include other devices developed in the art.

Hereinafter, electronic devices according to various embodiments will be described with reference to the accompanying drawings. In the present disclosure, the term "user" may indicate a person using the electronic device or a device (e.g., an artificial intelligence electronic device) using the electronic device.

FIG. 1 is a block diagram illustrating a wireless charging system according to one embodiment of the present disclosure.

Referring to FIG. 1, in one embodiment, a power transmission device 10 may include a power generation circuit 11, a control circuit 12, a communication circuit 13, and a sensing circuit 14.

In one embodiment, the power generation circuit 11 may include a power adaptor 11a that receives external power and appropriately converts the voltage of the received power. The power generation circuit 11 may further include a power generation circuit 11b that generates power, and a matching circuit 11c that maximizes efficiency between the transmission coil 11L and the reception coil 21L.

The control circuit 12 may perform the overall control of the power transmission device 10, and may generate various messages required for wireless power transmission. These messages may be transmitted by the communication circuit 13. In one embodiment, the control circuit 12 may calculate the amount of power to be transmitted to the power reception device 20 based on information received from the communication circuit 13. Once the amount of power is determined, the control circuit 12 may control the power generation circuit 11 so that the calculated amount of power is transmitted by the transmission coil 11L to the power reception device 20.

The communication circuit 13 may include at least one of a first communication circuit 13a and a second communication circuit 13b. The first communication circuit 13a may communicate with the first communication circuit 23a of the power reception device 20 using, for example, the same frequency as the frequency used for power transmission in the transmission coil 11L. This may be referred to as communication using an inband scheme). The second communication circuit 13b may communicate with the second communication circuit 23b of the power reception device 20 using, for example, a frequency different from the frequency used for power transmission in the transmission coil 11L. This may be referred to as communication using an outband scheme). For example, the second communication circuit 13b may acquire information related to the charged state of the power reception device 20 (e.g., voltages received by the power reception device 20, the current outputted by the reception coil 21L, etc.) from the second communication circuit 23b using various short-range communication methods such as Bluetooth, BLE, Wi-Fi, NFC, and the like.

In addition, the power transmission device 10 may further include a sensing circuit 14 for sensing the temperature or movement of the power transmission device.

In one embodiment, the power reception device 20 may include a power reception circuit 21, a control circuit 22, a communication circuit 23, at least one sensor 24, and a display 25. In the power reception device 20, descriptions of configurations corresponding to the power transmission device 10 may be partially omitted.

In one embodiment, the power reception circuit 21 may include a reception coil 21L that wirelessly receives power from the power transmission device 10, a matching circuit 21a, a rectifying circuit 21b that rectifies received alternating current (AC) power to direct current (DC) power, an adjustment circuit 21c that adjusts the charging voltage, a switch circuit 21d, and a battery 21e.

The control circuit 22 may perform the overall control of the power reception device 20, and may generate various messages required for wireless power transmission. These messages may be transmitted by the communication circuit 23.

The communication circuit 23 may include at least one of the first communication circuit 23a and the second communication circuit 23b. The first communication circuit 23a may communicate with the power transmission device 10 via the reception coil 21L. The second communication circuit 23b may communicate with the power transmission device 10 using various short-range communication methods such as Bluetooth, BLE, Wi-Fi, NFC, and the like.

In addition, the power reception device 20 may further include sensor(s) 24, which may include a current/voltage sensor, a temperature sensor, an illuminance sensor, a sound sensor, etc.

Figure 2:
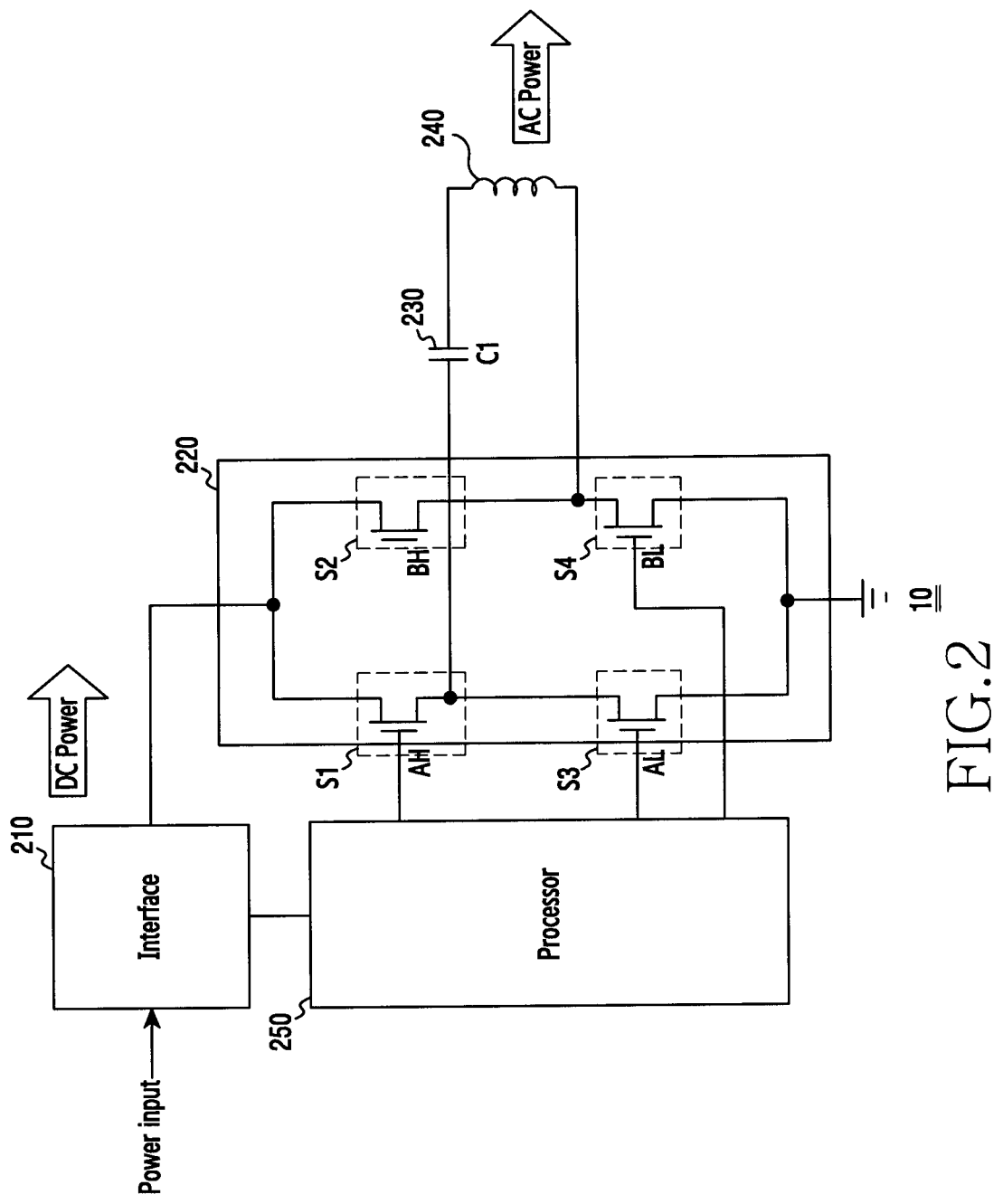
FIG. 2 is a block diagram illustrating components of a power transmission device in a wireless charging system according to one embodiment of the present disclosure.

FIG. 2 is a block diagram illustrating components of the power transmission device 10 in a wireless charging system according to one embodiment of the present disclosure.

In one embodiment, the power transmission device 10 may include an interface 210, a power generation circuit 220, a matching circuit 230, a transmission coil 240, and a processor 250.

The interface 210 may be connected to a power supply device (e.g., a travel adapter or a power supply) and may receive power from the power supply device. In one embodiment, the interface 210 may include a power line and a data line. The interface 210 may transmit the power from the power supply device to the processor 250 and the power generation circuit 220. In one embodiment, the interface 210 may be included in the power adaptor 11a of FIG. 1.

In FIG. 2, the power transmission device 10 does not include the power supply device, but the present disclosure is not so limited. Therefore in an alternate embodiment, the power transmission device 10 may include a power supply device. In one embodiment, the power supply device may convert AC power into DC power and may transmit the obtained DC power to the interface 210.

The power generation circuit 220 may include a DC-to-AC conversion circuit. The power generation circuit 220 may be configured as a full bridge circuit including four switches, as shown in FIG. 2. However, the power generation circuit 220 is not so limited.

The power generation circuit 220 may receive a control signal from the processor 250, and may convert DC power into AC power based at least in part on the received control signal. For example, when a control signal having a high level is applied to the gate AH of the switch S1 and the gate BL of the switch S4 and a control signal having a low level is applied to the gate BH of the switch S2 and the gate AL of a switch S3, the switch S1 and the switch S4 are turned on and the switch S2 and the switch S3 are turned off. When the switch S1 and the switch S4 are turned on and the switch S2 and the switch S3 are turned off, the power generation circuit 220 may output power having the same sign as that of DC power input from the interface 210 to the power generation circuit 220. For example, when the DC power input from the interface 210 to the power generation circuit 220 has a positive sign, a positive voltage may be output between the source of the switch S1 (or the drain of the switch S3) and the drain of the switch S4 (or the source of the switch S2). When a control signal having a low level is applied to the gate AH of the switch S1 and the gate BL of the switch S4 and a control signal having a high level is applied to the gate BH of the switch S2 and the gate AL of the switch S3, the switch S1 and the switch S4 may be turned off and the switch S2 and the switch S3 may be turned on. When the switch S1 and the switch S4 may be turned off and the switch S2 and the switch S3 may be turned on, the power generation circuit 220 may output power having a sign opposite that of the DC power input from the interface 210 to the power generation circuit 220. Accordingly, the power generation circuit 220 may convert DC power into AC power by periodically switching the switches S1, S2, S3, and S4 on and off.

In FIG. 2, the switches are illustrated as n-channel metal oxide semiconductor field effect transistors (NMOS FET), but the switches are not so limited. For example, the switches may be other FETs, bipolar junction transistors (BJT), diodes, etc.

The power generation circuit 220 of FIG. 2 may correspond to the power generation circuit 11b of FIG. 1.

In one embodiment, the matching circuit 230 may maximize efficiency between the transmission coil 240 and the reception coil 21L, and may include a matching element. In FIG. 2, the matching circuit 230 is illustrated as including a capacitor C1, but the matching circuit 230 is not so limited. Therefore, in other embodiments, the matching circuit 230 may include elements such as inductors or resistors, in addition to the capacitor C1.

The transmission coil 240 may transmit power to the reception coil 21L of the power reception device 20. The transmission coil 240 may be made of a conductive material.

The processor 250 may perform the overall control of the power transmission device 10. For example, the processor 250 may perform the same or similar functions as those performed by the control circuit 12 in FIG. 1. The processor 250 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Hereinafter, in order to comply with international standards (e.g., wireless power consortium (WPC) standard (Qi), alliance for wireless power (A4WP) standard, EN 300-330 standard, etc.) and reduce adverse effects on the human body caused by electro-magnetic interference (EMI) or the like, the operation for controlling wireless charging by the processor 250 will be described in detail later with reference to FIGS. 3A and 3B.

FIG. 2 shows the power transmission device 10 that wirelessly transmits power via electromagnetic inductive coupling, but the present disclosure is not so limited. For example, the power transmission device 10 may also transmit power by using electromagnetic resonance or electromagnetic waves.

An electronic device according to one embodiment of the present disclosure may include a conductive coil, a power generation circuit, and one or more processors operatively connected to the power generation circuit and may be configured to: compare an amount of transmission power to be supplied to a power reception device with designated threshold power amount, determine a designated frequency to be a frequency of a control signal for controlling the power generation circuit when the amount of transmission power is equal to or less than the designated threshold power amount, determine a phase of the control signal based at least in part on the amount of transmission power and/or the designated frequency when the designated frequency is determined to be the frequency of the control signal, transmit the control signal having the designated frequency and the phase to the power generation circuit to generate transmission power corresponding to the amount of transmission power, such that the transmission power is generated based at least in part on the control signal, and supply the transmission power generated by the power generation circuit to the power reception device wirelessly via the conductive coil.

In one embodiment, the electronic device may further include one or more communication circuits, and the one or more processors may be further configured to: receive power information from the power reception device through the one or more communication circuits, and determine the amount of transmission power based at least in part on the received power information.

In one embodiment, the designated frequency may correspond to the designated threshold power amount.

In one embodiment, the power generation circuit may include a full bridge circuit constituted of four switches, and in determining the phase of the control signal, the one or more processors may be further configured to at least partially overlap a first time interval during which two switches of the four switches are turned on and a second time interval during which remaining two switches of the four switches are turned on.

In one embodiment, when the designated frequency is determined to be the frequency of the control signal, the one or more processors may be further configured to determine a duty cycle of the control signal based at least in part on the amount of transmission power and/or the designated frequency.

In one embodiment, when the amount of transmission power is equal to or less than the designated threshold power amount, the one or more processors may be further configured to vary the frequency of the control signal within a designated frequency range.

In one embodiment, in varying the frequency of the control signal, the one or more processors may be further configured to decrease or increase the frequency of the control signal around the designated frequency in the designated frequency range.

In one embodiment, the one or more processors may be further configured to determine at least one of the phase and a duty cycle of the control signal based at least in part on the amount of transmission power and the varied frequency.

In one embodiment, the electronic device may wirelessly charge the power reception device by using electromagnetic induction, magnetic resonance, or electromagnetic waves.

The electronic device according to one embodiment of the present disclosure may include a conductive coil, a power generation circuit, and one or more processors operatively connected to the power generation circuit and may be configured to: compare an amount of transmission power to be supplied to a power reception device with designated threshold power amount, varying a frequency of a control signal for controlling the power generation circuit within a designated frequency range when the amount of transmission power is equal to or less than the designated threshold power amount, determine at least one of a phase and a duty cycle of the control signal based at least in part on the amount of transmission power and/or the varied frequency, transmit the control signal having at least one of the varied frequency, the determined phase, and the determined duty cycle to the power generation circuit to generate transmission power corresponding to the amount of transmission power, such that the transmission power is generated based at least in part on the control signal, and wirelessly supply the transmission power generated by the power generation circuit to the power reception device via the conductive coil.

FIGS. 3A and 3B are graphs illustrating a wireless charging method according to one embodiment of the present disclosure.

Referring to FIG. 3A, the power transmission device 10 may adjust (or control) the frequency of transmission power in order to adjust power to be supplied to the power reception device 20 (hereinafter, referred to as "transmission power," power amount, effective power amount, or average power amount). For example, the transmission power (or the power amount) may decrease along with an increase in the frequency of the transmission power, and may increase along with a decrease in the frequency of the transmission power. For example, in FIG. 3A, when the frequency of the transmission power increases, the transmission power may decrease. However, when the frequency of the transmission power is equal to or greater than a designated frequency, EMI exceeding a limit (e.g. an upper limit), as defined by international standards for emissions such as EN 300-330 V1.81, may occur.

In order to comply with international standards and reduce EMI, in various embodiments of the present disclosure, when determining (or calculating) the transmission power to be equal to or less than a designated threshold power, the power transmission device 10 may determine a frequency corresponding to the designated threshold power (hereinafter, referred to as "designated frequency") to be the frequency of the transmission power. For example, the designated frequency may be 148 kHz. The power transmission device 10 may adjust the phase and the duty cycle of the control signal output from the processor 250 to the power generation circuit 220 so that the control signal conforms to the designated frequency.

Figure 5A:
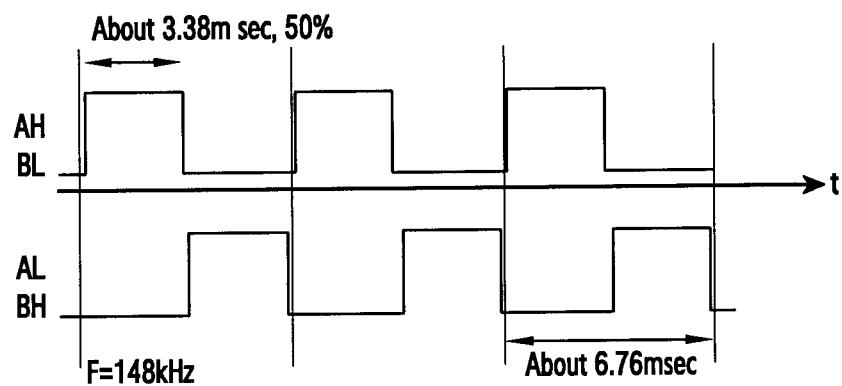
FIG. 5A, FIG. 5B, FIG. 6A, FIG. 6B and FIG. 6C are graphs illustrating examples of wireless charging methods according to various embodiments of the present disclosure.
Figure 5B:
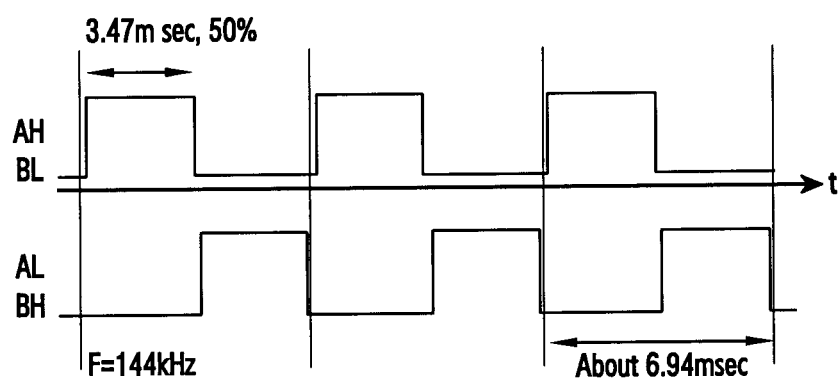

When determining the transmission power to exceed the designated threshold power, the power transmission device 10 may determine the frequency of the transmission power corresponding to the transmission power. For example, the power transmission device 10 may determine (or calculate) a frequency capable of generating the required amount of transmission power. At the same time, the phase and the duty cycle of the control signal output from the processor 250 may be set to a default. In one embodiment, when it is determined that the transmission power is in a range exceeding the designated threshold power, the power transmission device 10 may generate the transmission power having the default phase and duty cycle and having the frequency corresponding to the transmission power. As shown in FIGS. 5A and 5B, in the default phase and duty cycle, the time interval during which the high control signal is applied to switches S1 and S4 does not overlap with the time interval during which the high control signal is applied to the switches S2 and S3. Further, in the default phase and duty cycle, the duty cycle may be 50%. However, this is only one exemplary embodiment of the default phase and the duty cycle, and therefore the default phase and the duty cycle is not so limited.

Referring to FIG. 3B, in one embodiment, when determining the transmission power to be power W1 which is greater than the designated threshold power W2, the power transmission device 10 may determine the frequency of the transmission power to be the frequency f1 corresponding to the power W1. In such case, the power transmission device 10 may maintain the phase and the duty cycle of the control signal for controlling the power generation circuit 220 at the default phase and duty cycle.

In another embodiment, when determining the transmission power to be power W3 which is less than the designated threshold power W2, the power transmission device 10 may determine the frequency of the transmission power to be the designated frequency f2 corresponding to the designated threshold power W2. Note that the designated frequency f2 may not be the same as the frequency f3 corresponding to the power W3. Here, the frequency f3 may be the frequency of the transmission power corresponding to the transmission power W3, when the phase and the duty cycle of the control signal for controlling the power generation circuit 220 are set to the default phase and duty cycle.

When the power transmission device 10 transmits transmission power W3 at frequency f2, the power transmission device 10 may adjust the phase or the duty cycle of the control signal for controlling the power generation circuit 220 in order to generate the transmission power W3. For example, the power transmission device 10 may adjust the phase and/or duty cycle in order to lower the transmission power by ΔW shown in FIG. 3B. ΔW corresponds to a difference between the power W2, which is the power transmitted at the frequency f2, and the power W3.

For example, in order to lower the power by the power ΔW, the power transmission device 10 may transmit control signals to the gates AH, BL, BH, and AL so that the time interval during which the high control signal is applied to the switches S1 and S4 partially overlaps with the time interval during which the high control signal is applied to the switches S2 and S3. The overlapping time interval may be referred to hereinafter as "overlap time interval." An increased overlap time interval may correspond to an increased ΔW.

In another embodiment, in order to lower the power by the power ΔW, the power transmission device 10 may decrease the duty cycle of the control signal for controlling the power generation circuit 220. For example, the power transmission device 10 may reduce the duty cycles of the switches S1 to S4, i.e. the amount of time for which switches S1 and S4 or S2 and S3 are turned on may be decreased. In this embodiment, a decrease in duty cycle may correspond to an increase in ΔW. An increase in ΔW may signify a larger difference between W2 and W3.

In still another embodiment, in order to lower the power by the power ΔW, the power transmission device 10 may decrease the duty cycle while also set the overlap time interval. For example, ΔW may be broken into two parts ΔW1 and ΔW2. In this case, the power transmission device 10 may decrease the transmission power by ΔW1 by setting the overlap time interval, and may decrease the transmission power by ΔW2 by decreasing the duty cycle.

In the various embodiments disclosed above, the frequency of the transmission power may be the same as the frequency of the control signal for controlling the power generation circuit 220. Hereinafter, a method of adjusting the frequency of the control signal for controlling the power generation circuit 220 will be described. Because the frequency of the control signal is also the frequency of the transmission power, by virtue of adjusting the frequency of the control signal, the frequency of the transmission power may also be adjusted.

A wireless charging method in which the phase and/or the duty cycle of the control signal for controlling the power generation circuit 220 are adjusted will be described in detail with reference to FIGS. 4 to 8.

In order to comply with international standards and reduce EMI, in various embodiments, the transmission power may be controlled using frequency dithering. For example, the power transmission device 10 may determine the frequency of the transmission power within a designated frequency range, and may adjust the phase and/or the duty cycle of the control signal for controlling the power generation circuit 220 based at least in part on the transmission power and the changed frequency.

For example, in FIG. 3B, when the transmission power is determined or calculated to be the power W3, the power transmission device 10 may iteratively vary the frequency of the transmission power within a designated frequency range, for example, between the frequency f2 and the frequency f4. In one embodiment, the power transmission device 10 may adjust the phase and/or the duty cycle of the control signal for controlling the power generation circuit 220 to generate the transmission power having a frequency within the designated range.

The wireless charging method using frequency dithering will be described in detail with reference to FIGS. 9 to 15.

Figure 4:
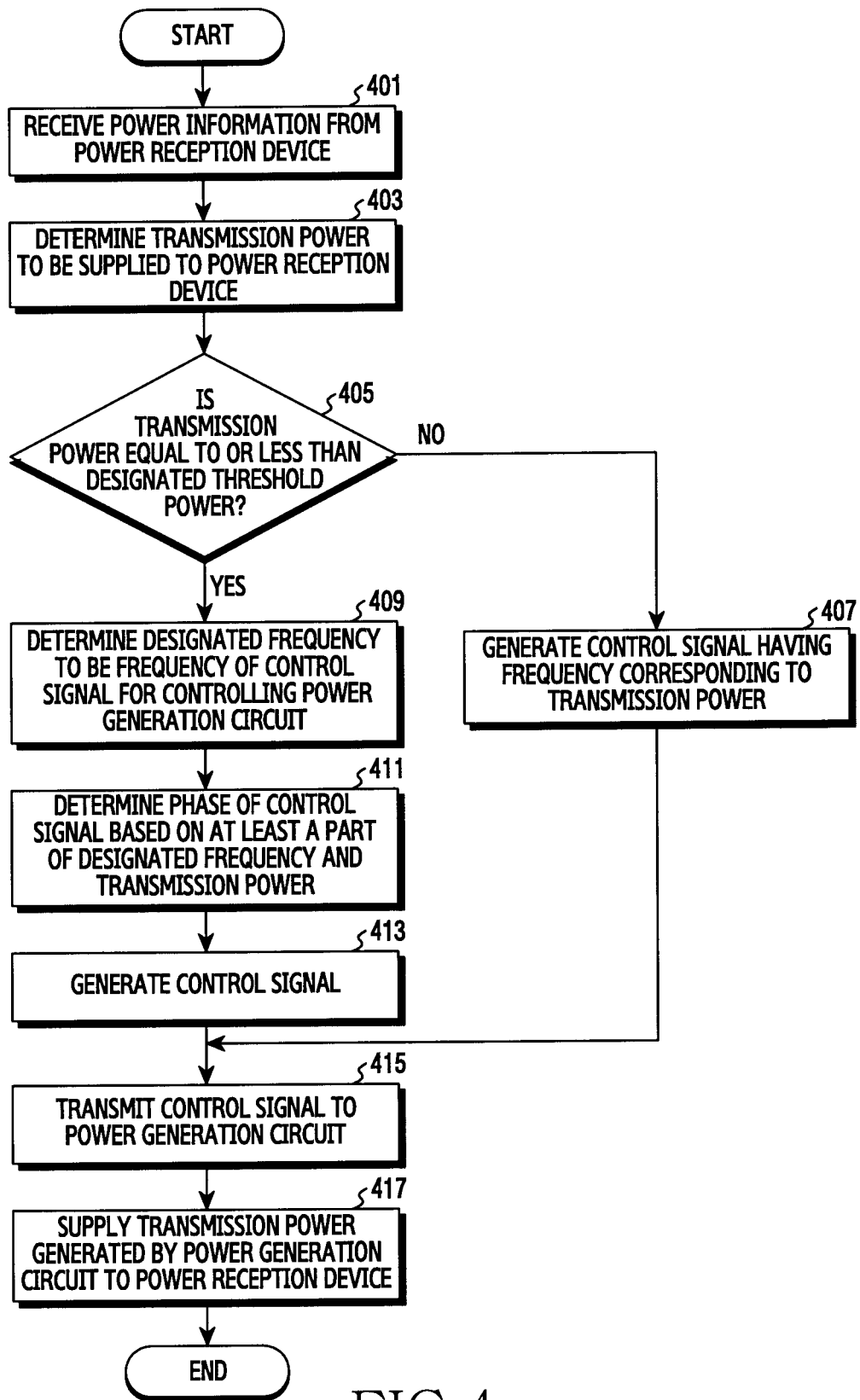
FIG. 4 is a flowchart illustrating a wireless charging method according to one embodiment of the present disclosure.

FIG. 4 is a flowchart illustrating a wireless charging method according to one embodiment of the present disclosure.

FIGS. 5A to 6C are graphs illustrating examples of wireless charging methods according to various embodiments of the present disclosure.

In the present disclosure, "power" may refer to voltage or current as well as power. For example, although the power generation circuit 11 is described below as generating the transmission power, the power generation circuit 11 may generate a voltage or a current corresponding to the transmission power. In addition, the disclosed threshold power may also refer to threshold voltage or current.

Referring to FIGS. 4 to 6C, in operation 401, the processor 250 may receive power information from the power reception device 20.

In one embodiment, the processor 250 may receive power information including information related to the charged state of the power reception device 20 from the power reception device 20 through the first communication circuit 13a or the second communication circuit 13b. For example, the processor 250 may receive a packet or a message indicating that the power reception device 20 needs a certain voltage from the power reception device 20. In another example, the processor 250 may receive information about the charged state of the battery 21e from the power reception device 20. In yet another example, the power reception device 20 may sense a voltage (e.g., Vrec) of a rectifying capacitor Crec in the rectifying circuit 21b, and may transmit information about the sensed voltage (e.g., the Vrec value or a change in the Vrec value) to the power transmission device 10 through the communication circuit 23. In one embodiment, when the voltage of the rectifying capacitor in the rectifying circuit 21b is higher than the voltage required for charging the power reception device 20, the power reception device 20 may transmit a request to the power transmission device 10 to decrease the transmission power. Conversely, when the voltage of the rectifying capacitor in the rectifying circuit 21b is lower than the voltage required for charging the power reception device 20, the power reception device 20 may transmit a request to the power transmission device 10 to increase the transmission power. In operation 403, the processor 250 may determine transmission power to be supplied to the power reception device 20. For example, the processor 250 may determine or calculate the transmission power to be supplied to the power reception device 20 based at least in part on the power information received from the power reception device 20. For example, the processor 250 may determine the transmission power based on a request from the power reception device 20 to increase or decrease the transmission power.

In operation 405, the processor 250 may determine whether the transmission power determined in operation 403 is equal to or less than a designated threshold power.

In one embodiment, the designated threshold power may correspond to the power W2 (with corresponding designated frequency f2), as shown in FIG. 3B. The designated threshold power may correspond to power generated by the power generation circuit 220 when the frequency of the control signal for controlling the power generation circuit 220 is set to a designated frequency (e.g., f2), and the phase and duty cycle of the control signal are set default (e.g., phase is set so there is no overlapping time intervals and duty cycle is set to 50%). However, the designated threshold power is not so limited.

In operation 407, when the transmission power is determined to exceed the designated threshold power in operation 405, the processor 250 may generate a control signal having a frequency corresponding to the transmission power. For example, the processor 250 may determine a frequency capable of generating the transmission power while having the default phase and the duty cycle. In various embodiments, the default phase and the duty cycle may be set in ranges such that the transmission power exceeds the designated threshold power. For example, as shown in FIG. 5A, the default phase may be set so that the time interval when the high control signal is applied to switches S1 and S4 does not overlap with the time interval when the high control signal is applied to switches S2 and S3. Also as shown in FIG. 5A, the default duty cycle may be set to 50%. However, the default phase and the duty cycle are not so limited. The processor 250 may generate the control signal having the determined frequency and the default phase and the duty cycle. For example, as shown in FIG. 3B, when the transmission power is determined to be power W1, which is greater than the designated threshold power W2, the processor 250 may determine that frequency f1 is capable of generating the transmission power W1 with the phase and the duty cycle set to default. Accordingly, the processor 250 may set the frequency of the control signal for controlling the power generation circuit 220 to be f1, and may generate the corresponding control signal.

In operation 409, when the transmission power is equal to or less than the designated threshold power in operation 405, the processor 250 may determine the designated frequency to be the frequency for controlling the power generation circuit 220.

In one embodiment, when electromagnetic induction is used to wirelessly transmit power, international standards (e.g., EN 300-330 V1.81) may require that the frequency for controlling the power generation circuit 220 to be equal to or less than 148.5 kHz. When the transmission power is equal to or less than the designated threshold power in operation 405, the processor 250 may determine the designated frequency to be at or below this upper-bound frequency. For example, as shown in FIG. 5A, the processor 250 may determine the frequency to drive the gates AH, BL, BH, and AL in the power generation circuit 220 to be 148 kHz. In another embodiment, as shown in FIG. 5B, the processor 250 may determine the designated frequency to be 144 kHz, so as to better ensure a reduction in EMI. Accordingly, the designated frequency is not limited to 148 kHz or 144 kHz, but rather is dependent on the applicable international standards, the desired reduction in EMIs, the ways in which wireless power transmission is achieved (e.g. electromagnetic induction v. electromagnetic resonance), etc.

In operation 411, the processor 250 may determine the phase of the control signal based at least in part on the designated frequency and the transmission power.

In one embodiment, the transmission power may be changed according to the overlap between the time interval when the high control signal is applied to the switches S1 and S4 and the time interval when the high control signal is applied to the switches S2 and S3. For example, due to the power generation circuit 220 being a full bridge circuit, as shown in FIG. 2, the power transmission device 10 may not transmit power to the power reception device 20 when the switches S1 to S4 are all (i.e. simultaneously) turned on or turned off. Instead, the power transmission device 10 may transmit power to the power reception device 20 when the switches S1 and S4 are turned on but the switches S2 and S3 are turned off, or when the switches S2 and S3 are turned on but the switches S1 and S4 are turned off.

Accordingly, in one embodiment, the processor 250 may receive a request for transmission power W3 from the power reception device 20. However, as shown in FIG. 3B, transmission power W3 corresponds to frequency f3 which is higher than the upper-bound frequency f2. Thus, the frequency of the control signal to output the transmission power is set to f2. But that creates a problem because typically, i.e. if the phase and duty cycle of the control signal are set to default, the control signal at frequency f2 produces transmission power W2. To reduce the transmission power by ΔW such that W3 is produced, the phase and/or duty cycle of the control signal may be adjusted. For example, to reduce the transmission power by ΔW, the processor 250 may adjust the phase of the control signals such that the time interval when the high control signal is applied to the switches S1 and S4 partially overlap with the time interval when the high control signal is applied to the switches S2 and S3. The greater the overlap, the lower the power W3.

Examples are shown in FIG. 6. For instance, when the frequency of the control signal for controlling the gates AH, BL, BH, and AL is determined to be 144 kHz and the duty cycle is set to 50%, the processor 250 may determine or adjust the phase of the control signal for controlling the gates AH, BL, BH, and AL in such a manner that the time interval when the high control signal is applied to the gates AH and BL partially overlaps with the time interval when the high control signal is applied to the gates AL and BH.

Figure 6A:
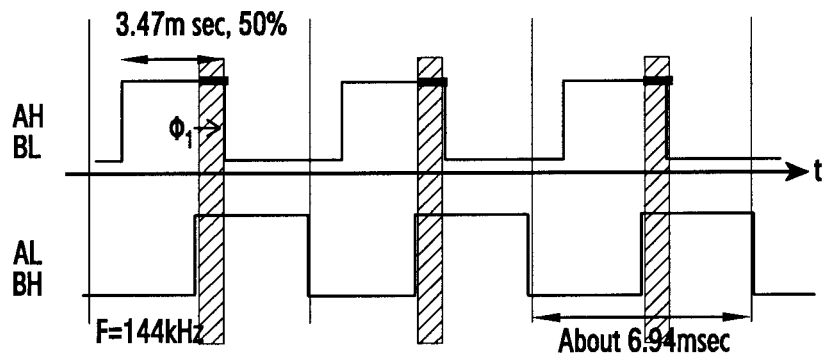

For example, to achieve the overlap, the processor 250 may maintain the default phase of the control signals applied to the gates AL and BH and may change or delay the phase of the control signals applied to the gates AH and BL by phase φ1, as shown in FIG. 6A.

Figure 6B:
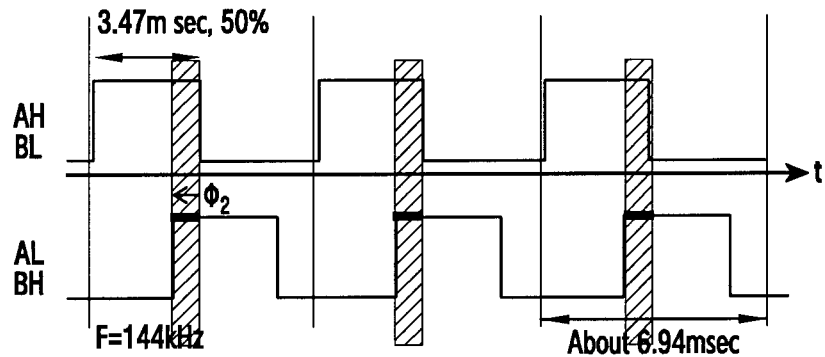

In another example, the processor 250 may maintain the default phase of the control signals applied to the gates AH and BL and may change the phase of the control signals applied to the gates AL and BH by phase φ2, as shown in FIG. 6B.

Figure 6C:
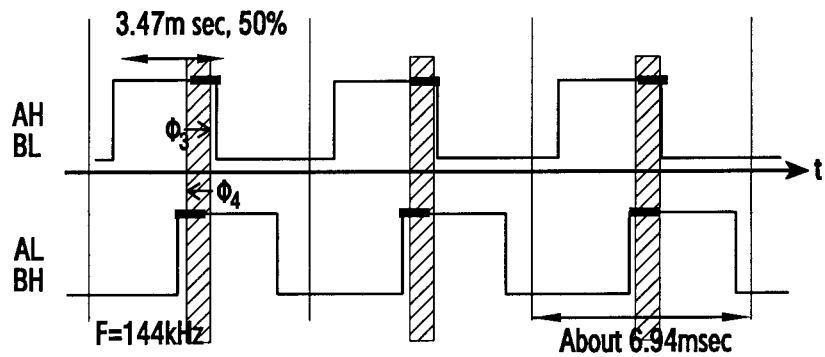

In still another example, the processor 250 may change the phase of the control signals applied to the gates AL and BH by phase φ4 while also changing the phase of the control signals applied to the gates AH and BL by phase φ3, as shown in FIG. 6C.

In operation 413, the processor 250 may generate the control signal having the designated frequency determined in operation 409 and the phase determined in operation 411.

For example, the processor 250 may generate the control signal having the duty cycle of 50%, which is the default duty cycle, and having the designated frequency and the phase determined as explained above.

In operation 415, the processor 250 may transmit the control signal generated in operation 407 or operation 413 to the power generation circuit 220.

For example, the processor 250 may transmit the control signal to the gates AH, BH, AL, and BL of the switches S1 to S4, so that the power generation circuit 220 may generate the appropriate transmission power.

In operation 417, the power transmission device 10 may supply the transmission power generated by the power generation circuit 220 to the power reception device 20 wirelessly via the conductive coil.

For example, the power generation circuit 220 may generate the transmission power based on the control signals applied from the processor 250. The power (e.g., AC power) generated by the power generation circuit 220 may be supplied to the power reception device 20 wirelessly via the conductive coil.

Figure 7:
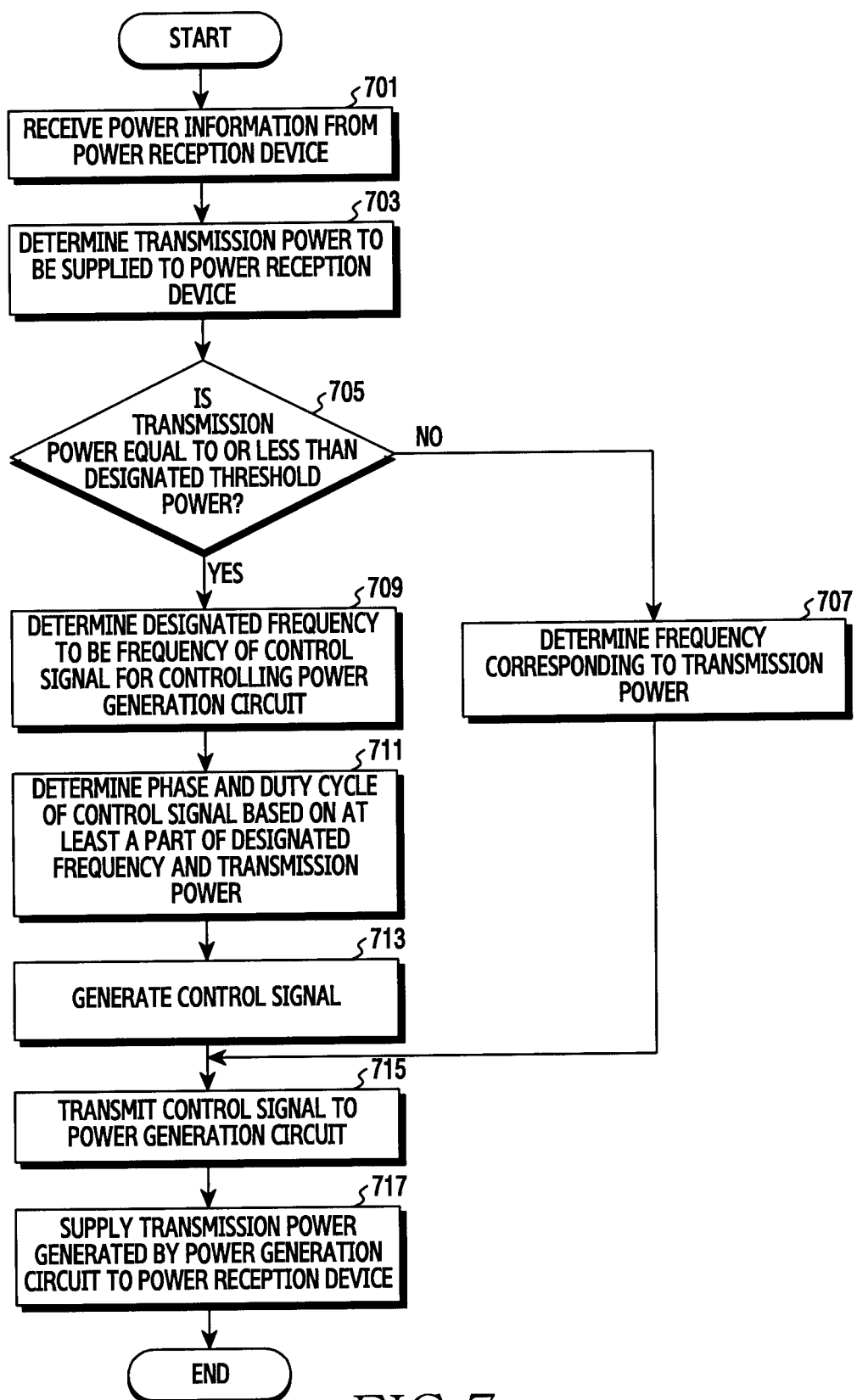
FIG. 7 is a flowchart illustrating a wireless charging method according to one embodiment of the present disclosure.

FIG. 7 is a flowchart illustrating a wireless charging method according to one embodiment of the present disclosure.

Figure 8A:
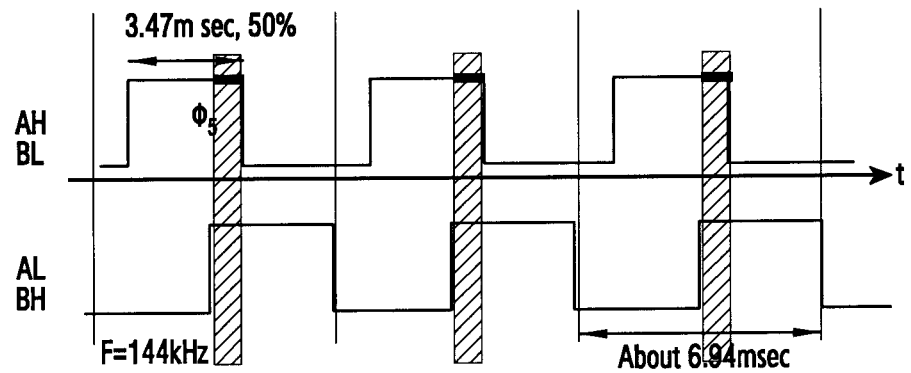
FIG. 8A and FIG. 8B are graphs illustrating examples of wireless charging methods according to various embodiments of the present disclosure.
Figure 8B:
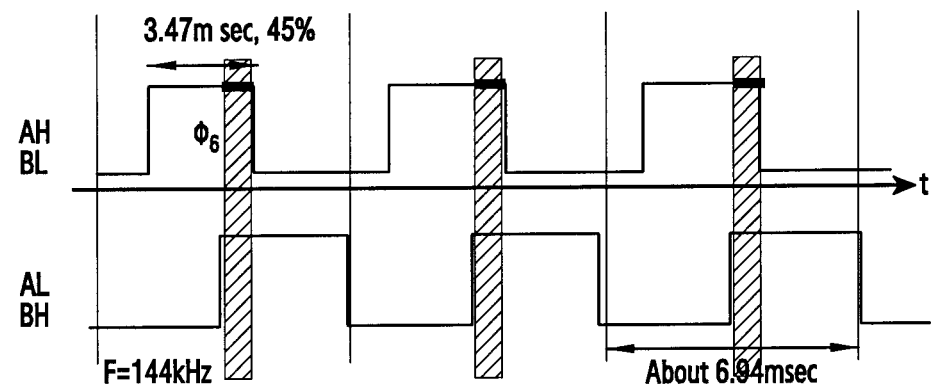

FIGS. 8A and 8B are graphs illustrating examples of wireless charging methods according to various embodiments of the present disclosure.

FIGS. 7 to 8B illustrate a wireless charging method where the phase and the duty cycle of the control signal of the power generation circuit 220 are adjusted.

Operations 701 to 709 in FIG. 7 are similar to operations 401 to 409 in FIG. 4, and thus detailed description thereof will be omitted.

In operation 711, the processor 250 may determine the phase and the duty cycle of the control signal based on the designated frequency and the transmission power.

In one embodiment, to reduce the transmission power by ΔW at frequency f2, the processor 250 may determine the phase of the control signal such that the time interval when the high control signal is applied to the switches S1 and S4 partially overlaps with the time interval when the high control signal is applied to the switches S2 and S3.

For example, as shown in FIG. 8A, to reduce the transmission power by ΔW at frequency f2 (e.g., 144 kHz), the processor 250 may determine the phase of the control signal in such a manner that the phase of the high control signal applied to the gates AH and BL and the phase of the high control signal applied to the gates BH and AL overlap each other by a phase φ5. In the example shown in FIG. 8A, the duty cycle is maintained at 50%.

However, in order to generate the same transmission power as the transmission power in FIG. 8A, the processor 250 may determine the phase of the control signal in such a manner that the phase of the high control signal applied to the gates AH and BL and the phase of the high control signal applied to the gates BH and AL overlap each other by a phase φ6. The overlap may be smaller than the overlap shown in FIG. 8A. To compensate, the duty cycle may be changed to 45%, as shown in FIG. 8B. For example, ΔW of FIG. 3 may be separate into a sum of ΔW3 and ΔW4, and the processor 250 may determine the phase φ6 in order not to generate the power corresponding to ΔW3, and may decrease the duty cycle from the default in order not to generate the power corresponding to ΔW4.

Although not shown in operation 711, in alternative embodiments, the processor 250 may adjust only the duty cycle without adjusting the phase of the control signal. For example, the processor 250 may maintain the phase of the control signal at the default phase and may decrease the duty cycle in order not to generate the power corresponding to the power ΔW of FIG. 3.

In operation 713, the processor 250 may generate the control signal having the designated frequency determined in operation 709 and the phase and the duty cycle determined in operation 711.

In operation 715, the processor 250 may transmit the control signal generated in operation 707 or 713 to the power generation circuit 220.

For example, the processor 250 may transmit the control signal to the gates AH, BH, AL, and BL of the switches S1 to S4, so that the power generation circuit 220 may generate the appropriate transmission power.

In operation 717, the power transmission device 10 may supply the transmission power generated by the power generating circuit 220 to the power reception device 20 wirelessly via the conductive coil.

For example, the power generation circuit 220 may generate the transmission power based on the control signals applied from the processor 250. The power (e.g., AC power) generated by the power generation circuit 220 may be supplied to the power reception device 20 wirelessly via the conductive coil.

Figure 9:
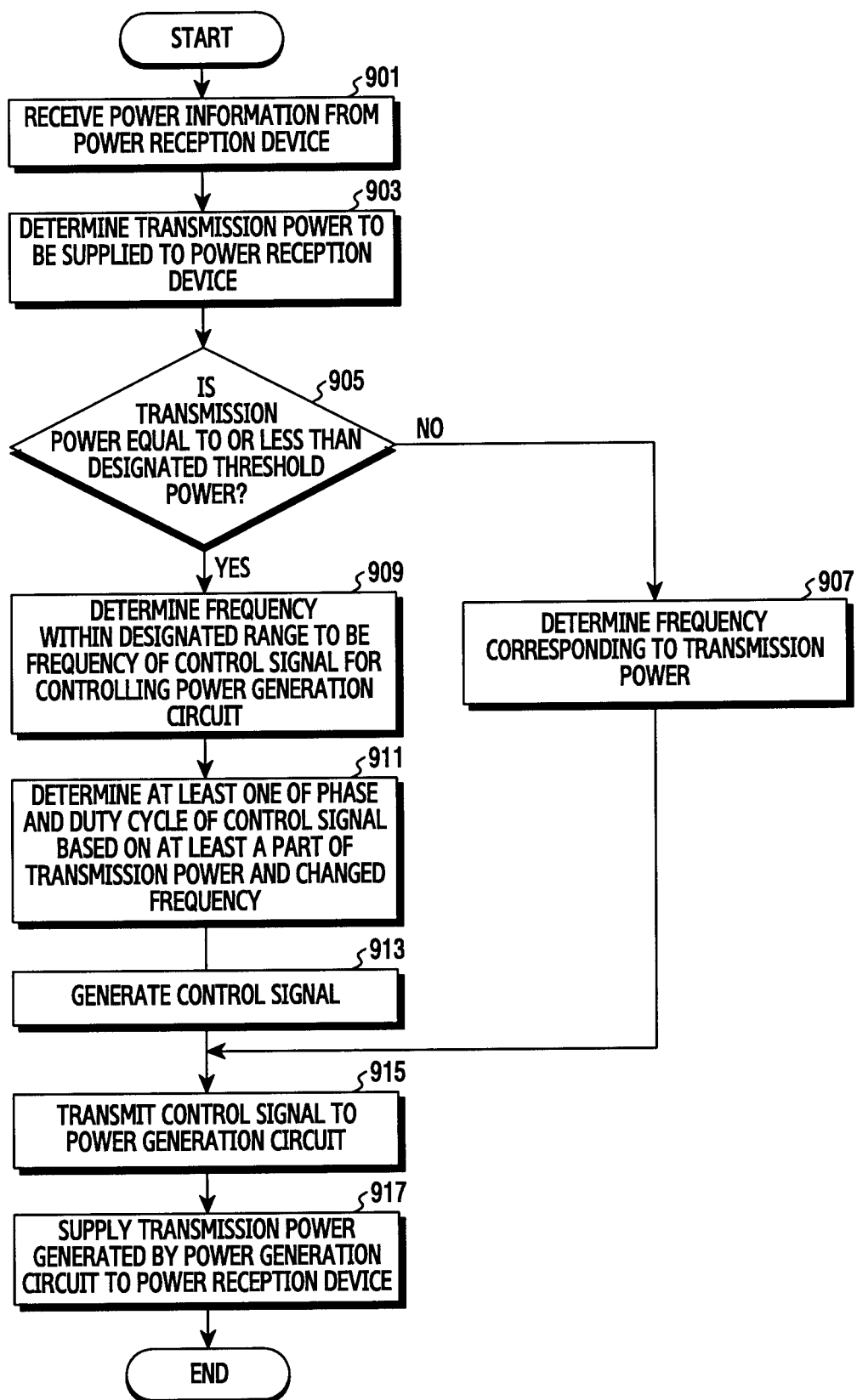
FIG. 9 is a flowchart illustrating a wireless charging method according to one embodiment of the present disclosure.

FIG. 9 is a flowchart illustrating a wireless charging method according to one embodiment of the present disclosure.

FIGS. 10 to 15B are various graphs illustrating examples of wireless charging methods according to various embodiments of the present disclosure.

FIGS. 9 to 15B illustrate a method of controlling transmission power using frequency dithering, such that EMI is reduced and power transmission complies with the relevant international standards.

Operations 901 to 907 in FIG. 9 are similar to operations 401 to 407 in FIG. 4 or operations 701 to 707 in FIG. 7, and thus detailed description thereof will be omitted.

In operation 909, the processor 250 may determine a frequency within a designated range to be the frequency of the control signal for controlling the power generation circuit 220.

Figure 10:
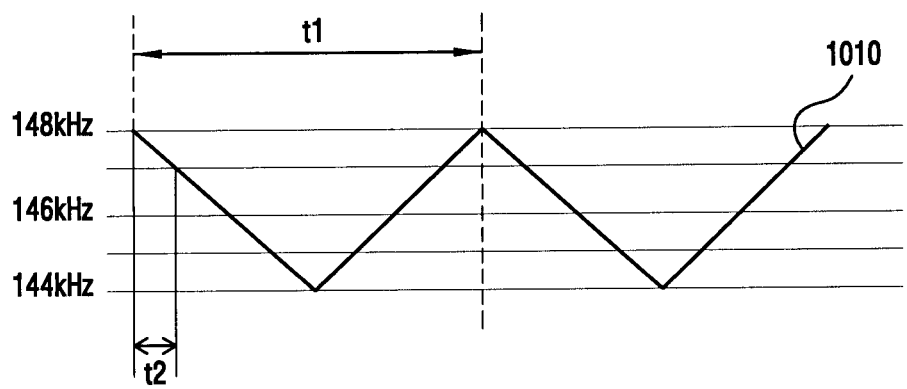
FIG. 10, FIG. 11A, FIG. 11B, FIG. 12A, FIG. 12B, FIG. 13, FIG. 14A, FIG. 14B, FIG. 15A and FIG. 15B are various graphs illustrating examples of wireless charging methods according to various embodiments of the present disclosure.

For example, as shown in FIG. 10, the processor 250 may iteratively vary the frequency of the control signal based on the designated frequency (e.g., 146 Hz). For example, the frequency of the control signal may vary between an upper limit frequency (e.g., 148 kHz) and a lower limit frequency (e.g., 144 kHz).

In one embodiment, by using frequency dithering, EMI which occurs by harmonics of the fundamental frequencies of the control signal may be avoided.

Figures 11A, 11B:
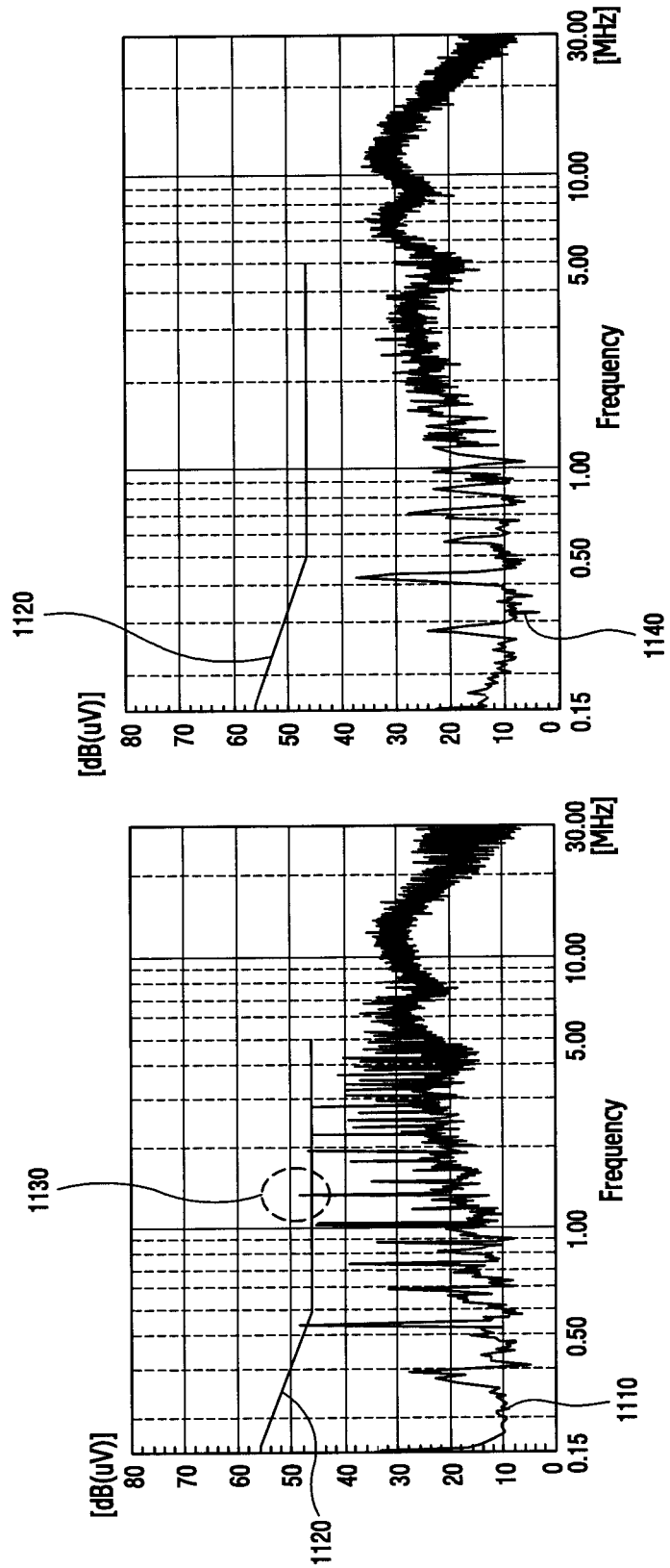

For example, FIG. 11A shows the radiated emission amount when frequency dithering is not used (or applied). As shown in FIG. 11A, when frequency dithering method, the power transmission device 10 may output a radiated emission amount exceeding the reference value 1120 at frequency 1130 among frequencies 1110. FIG. 11B shows the radiated emission amount when frequency dithering is used. As shown in FIG. 11B, when frequency dithering is used, the power transmission device 10 may output a radiated emission amount not exceeding the reference value 1120 within the frequencies 1140.

The upper limit frequency (e.g., 148 kHz) and/or the lower limit frequency (e.g., 144 kHz) disclosed herein may be changed in alternative embodiments.

Figure 3:
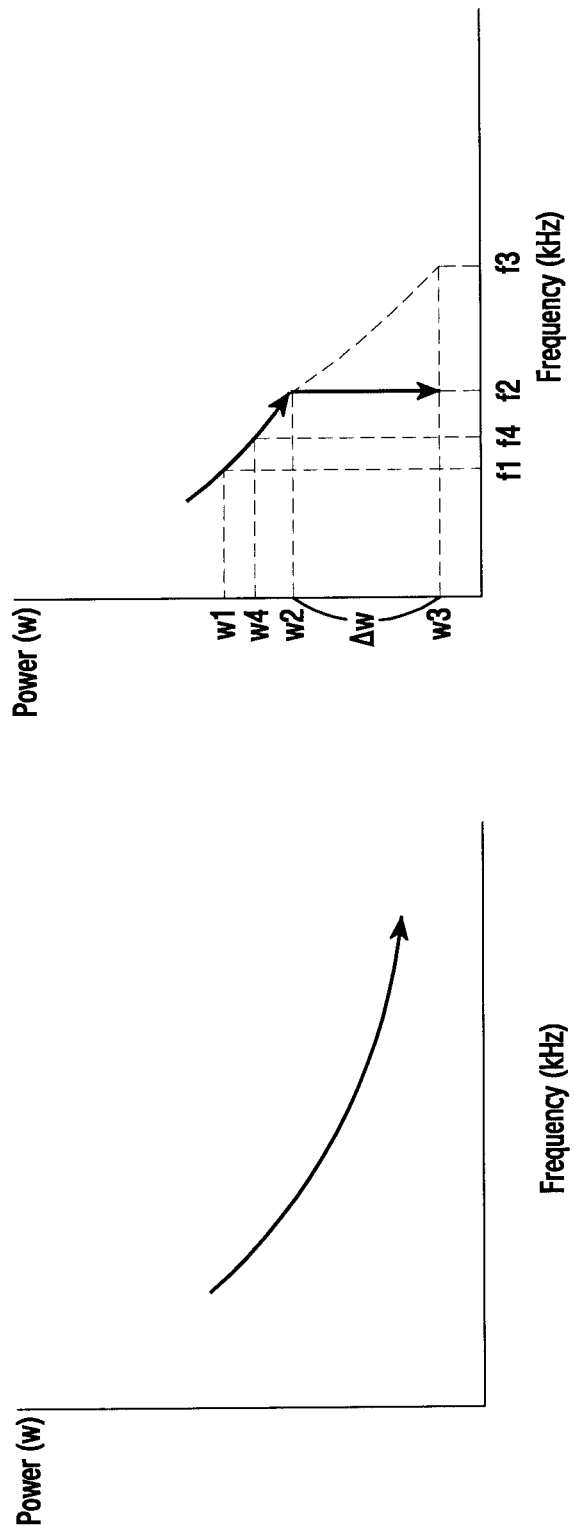
FIG. 3A and FIG. 3B are graphs illustrating a wireless charging method according to one embodiment of the present disclosure.

In one embodiment, the upper limit frequency of the designated range may be set to be the designated frequency corresponding to the designated threshold power, for example, f2 in FIG. 3. However, the upper limit frequency is not limited thereto, and may be determined to be a frequency lower than the designated frequency.

The designated range or the lower limit frequency of the designated range may be determined in consideration of the desired reduction in EMI, the requested amount of transmission power, the stability of power transmission, etc. For example, when the designated range is narrow, frequency dithering may not result in a large EMI reduction. Conversely, if the designated range is larger, the range of variation in the transmission power also becomes larger, and thus, the wireless power transmission operation may become unstable. Accordingly, the designated frequency range may be designed in consideration of these tradeoffs.

In one embodiment, as shown in FIG. 10, the frequency of the control signal may be varied within a constant period (e.g., t1). For example, the time during which the frequency of the control signal is changed by 1 kHz (e.g., the time during which the frequency is reduced from 48 kHz to 147 kHz) may be 5 ms.

In another embodiment, the frequency of the control signal may be changed over irregular time intervals.

Figure 12A:
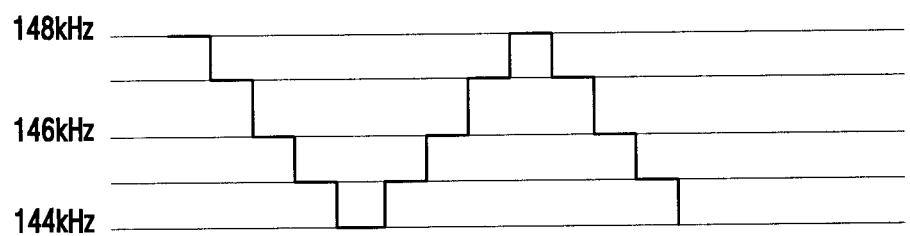
Figure 12B:
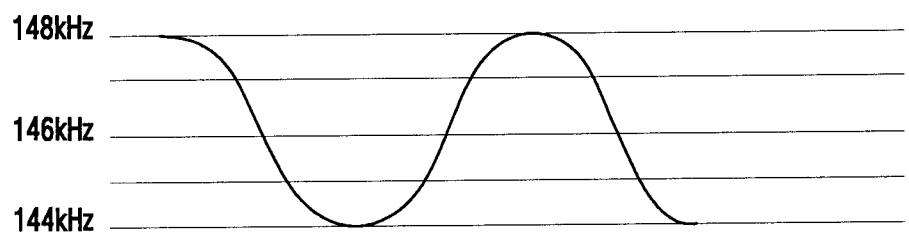

In FIG. 10, the frequency of the control signal is illustrated as linearly decreasing and increasing, but the present disclosure is not so limited. For example, as shown in FIG. 12A, the frequency of the control signal may be stepped up and/or stepped down. In another embodiment, as shown in FIG. 12B, the frequency of the control signal may decrease and increase (or increase and decrease) in the form of sine waves.

In operation 911, the processor 250 may determine the phase and/or the duty cycle of the control signal based on the transmission power and the changed frequency of the control signal.

Figure 13:
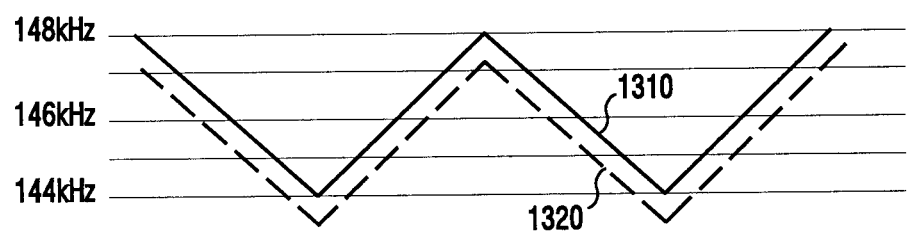

In one embodiment, the processor 250 may determine or adjust the duty cycle according to the frequency varied within the range designated in operation 909 to generate the transmission power determined in operation 903. As shown in FIG. 13, when the frequency 1310 of the control signal is changed within the designated range (e.g., 148 kHz to 144 kHz), the duty cycle 1320 may also be changed according to the changing frequency. For example, when the transmission power is determined to be W3 in FIG. 3B and the designated frequency range is between f2 to f4, a duty cycle (e.g., 45%)

may be used when the frequency of the control signal is f2, in order to lower the transmission power by ΔW. Another duty cycle (e.g., 40%) may be used when the frequency of the control signal is f4, in order to lower the transmission power from W4 to W3. When the frequency is between f2 and f4, the duty cycle may be between 40% and 45%.

Figure 14A:
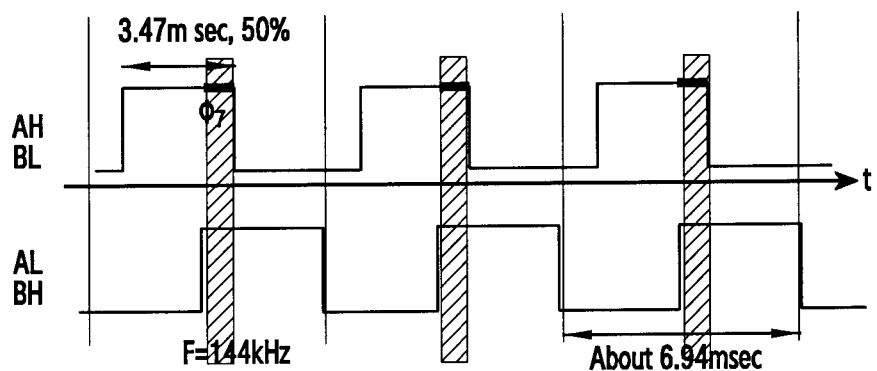
Figure 14B:
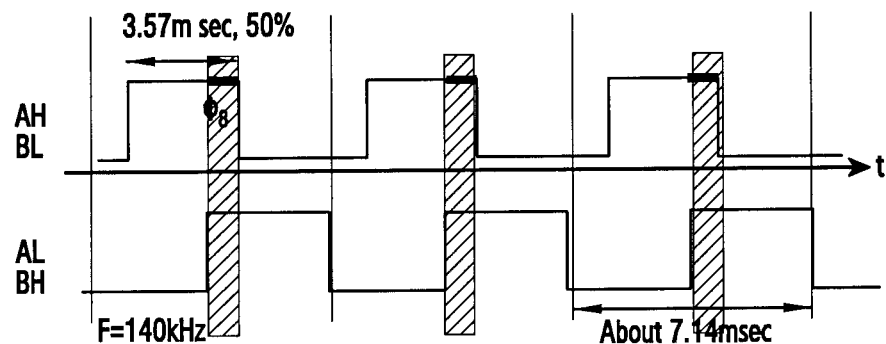
Figure 15A:
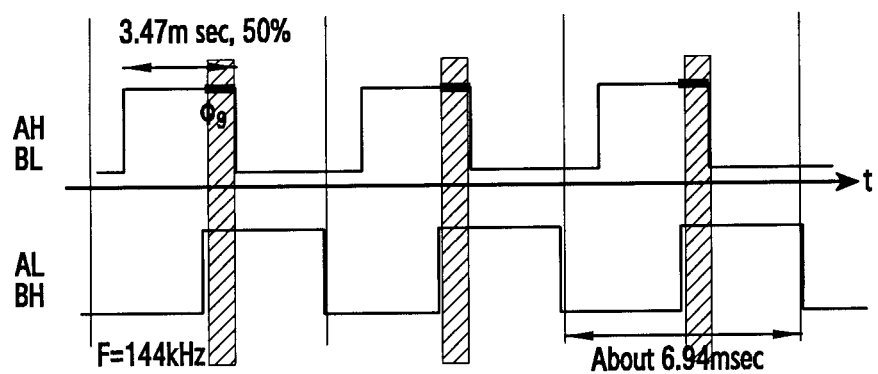
Figure 15B:
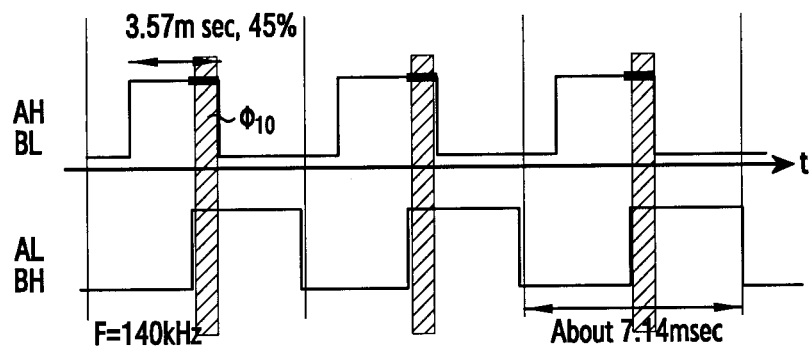

In another embodiment, the processor 250 may determine or adjust the phase of the control signal in accordance with the frequency varied within the range designated in operation 909, to generate the transmission power determined or calculated in operation 903. For example, in FIG. 14A, when the transmission power is W3, the duty cycle is 50%, and the frequency is 144 kHz, the phase of the control signal may be determined such that the phase of the high control signal applied to the gates AH and BL and the phase of the high control signal applied to the gates BH and AL overlap each other by the phase φ7. In FIG. 14B, when the transmission power is W3, the duty cycle is 50%, and the frequency is 140 kHz, the overlapping phase of the control signal may be determined to be the phase φ8. Phase φ8 may be a time interval that is longer than the phase φ7.

In still another embodiment, the processor 250 may determine or adjust the phase and the duty cycle of the control signal in accordance with the frequency varied within the designated range in operation 909, to generate the transmission power determined in operation 903. For example, in FIG. 15A, when the transmission power is W5 and the frequency is 144 kHz, the duty cycle may be determined to be 50% and the phase of the control signal may be determined to overlap by the phase φ9. But when the transmission power is W5 and the frequency is 140 kHz in FIG. 15B, the duty cycle may be determined to be 45% and the phase of the control signal may be determined to overlap by the phase φ10.

In operation 913, the processor 250 may generate the control signal having the frequency determined in operation 909 and the phase and the duty cycle determined in operation 911.

In operation 915, the processor 250 may transmit the control signal generated in operation 907 or 913 to the power generation circuit 220.

For example, the processor 250 may transmit the control signal to the gates AH, BH, AL, and BL of the switches S1 to S4, so that the power generation circuit 220 may generate the appropriate transmission power.

In operation 917, the power transmission device 10 may supply the transmission power generated by the power generating circuit 220 to the power reception device 20 wirelessly via the conductive coil.

For example, the power generation circuit 220 may generate the transmission power based on the control signals applied from the processor 250. The power (e.g., AC power) generated by the power generation circuit 220 may be supplied to the power reception device 20 wirelessly via the conductive coil.

The wireless charging method according to one embodiment of the present disclosure may include operations of comparing an amount of transmission power to be supplied to a power reception device with designated threshold power amount; determining a designated frequency to be a frequency of a control signal for controlling a power generation circuit when the amount of transmission power is equal to or less than the designated threshold power amount; determining a phase of the control signal based at least in part on the amount of transmission power and/or the designated frequency when the designated frequency is determined to be the frequency of the control signal; transmitting the control signal having the designated frequency and the phase to the power generation circuit to generate transmission power corresponding to the amount of transmission power, such that the transmission power is generated based at least in part on the control signal; and wirelessly supplying the transmission power generated by the power generation circuit to the power reception device via a conductive coil.

In one embodiment, the wireless charging method may further include operations of receiving power information from the power reception device through one or more communication circuits; and determining the amount of transmission power based at least in part on the received power information.

In one embodiment, the designated frequency corresponds to the designated threshold power amount.

In one embodiment, the power generation circuit may include a full bridge circuit constituted of four switches, and the operation of determining the phase of the control signal may further include an operation of at least partially overlapping a first time interval during which two switches of the four switches are turned on and a second time interval during which remaining two switches of the four switches are turned on.

In one embodiment, when the designated frequency is determined to be the frequency of the control signal, the wireless charging method may further include an operation of determining a duty cycle of the control signal based at least in part on the amount of transmission power and/or the designated frequency.

In one embodiment, the wireless charging method may further include an operation of varying the frequency of the control signal within a designated frequency range, when the amount of transmission power is equal to or less than the designated threshold power amount.

In one embodiment, the wireless charging method may further include an operation of decreasing or increasing the frequency of the control signal around the designated frequency in the designated frequency range.

In one embodiment, the wireless charging method may further include an operation of determining at least one of the phase and a duty cycle of the control signal based at least in part on the amount of transmission power and the varied frequency.

In one embodiment, the wireless charging method may use electromagnetic induction, magnetic resonance, or electromagnetic waves.

In addition, the data structures used in the above-described embodiments of the present disclosure can be recorded on a computer-readable recording medium through various means. The computer-readable recording medium includes a storage medium such as a magnetic storage medium (e.g., ROM, floppy disk, hard disk, etc.), an optical reading medium (e.g., CD-ROM, DVD, etc.), or the like.

The present disclosure has been discussed above in connection with the exemplary embodiments thereof. It will be understood by those skilled in the art that the present disclosure may be implemented in modified forms without departing from the essential characteristics of the present disclosure. Therefore, the embodiments disclosed herein should be considered as illustrative rather than limiting. The scope of the present disclosure is found not in the above description but in the accompanying claims, and all differences falling within the scope of the claims should be construed as being included in the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
a conductive coil;
a power generation circuit; and
one or more processors operatively connected to the power generation circuit and configured to:
compare an amount of transmission power to be supplied to a power reception device with designated threshold power amount,
determine a designated frequency to be a frequency of a control signal for controlling the power generation circuit when the amount of transmission power is equal to or less than the designated threshold power amount,
determine a phase of the control signal based at least in part on the amount of transmission power and/or the designated frequency when the designated frequency is determined to be the frequency of the control signal,
transmit the control signal having the designated frequency and the phase to the power generation circuit to generate, based at least in part on the control signal, transmission power corresponding to the amount of the transmission power, and
supply the transmission power generated by the power generation circuit to the power reception device wirelessly via the conductive coil.

2. The electronic device of claim 1, further comprising:
one or more communication circuits, wherein the one or more processors are further configured to:
receive power information from the power reception device through the one or more communication circuits, and
determine the amount of transmission power based at least in part on the received power information.

3. The electronic device of claim 1, wherein the designated frequency corresponds to the designated threshold power amount.

4. The electronic device of claim 1, wherein:
the power generation circuit includes a full bridge circuit including four switches, and
in determining the phase of the control signal, the one or more processors are further configured to at least partially overlap a first time interval during which two switches of the four switches are turned on and a second time interval during which remaining two switches of the four switches are turned on.

5. The electronic device of claim 1, wherein, when the designated frequency is determined to be the frequency of the control signal, the one or more processors are further configured to determine a duty cycle of the control signal based at least in part on the amount of transmission power and/or the designated frequency.

6. The electronic device of claim 1, wherein, when the amount of transmission power is equal to or less than the designated threshold power amount, the one or more processors are further configured to vary the frequency of the control signal within a designated frequency range.

7. The electronic device of claim 6, wherein, in varying the frequency of the control signal, the one or more processors are further configured to decrease or increase the frequency of the control signal around the designated frequency in the designated frequency range.

8. The electronic device of claim 6, wherein the one or more processors are further configured to determine at least one of the phase and a duty cycle of the control signal based at least in part on the amount of transmission power and the varied frequency.

9. The electronic device of claim 1, wherein the electronic device wirelessly charges the power reception device by using electromagnetic induction, magnetic resonance, or electromagnetic waves.

10. A wireless charging method comprising:
comparing an amount of transmission power to be supplied to a power reception device with designated threshold power amount;
determining a designated frequency to be a frequency of a control signal for controlling a power generation circuit when the amount of transmission power is equal to or less than the designated threshold power amount;
determining a phase of the control signal based at least in part on the amount of transmission power and/or the designated frequency when the designated frequency is determined to be the frequency of the control signal;
transmitting the control signal having the designated frequency and the phase to the power generation circuit to generate, based at least in part on the control signal, transmission power corresponding to the amount of transmission power; and
wirelessly supplying the transmission power generated by the power generation circuit to the power reception device via a conductive coil.

11. The wireless charging method of claim 10, further comprising:
receiving power information from the power reception device through one or more communication circuits; and
determining the amount of transmission power based at least in part on the received power information.

12. The wireless charging method of claim 10, wherein the designated frequency corresponds to the designated threshold power amount.

13. The wireless charging method of claim 10, wherein:
the power generation circuit includes a full bridge circuit including four switches, and
the determining of the phase of the control signal includes at least partially overlapping a first time interval during which two switches of the four switches are turned on and a second time interval during which remaining two switches of the four switches are turned on.

14. The wireless charging method of claim 10, wherein, when the designated frequency is determined to be the frequency of the control signal, the wireless charging method further comprises determining a duty cycle of the control signal based at least in part on the amount of transmission power and/or the designated frequency.

15. The wireless charging method of claim 10, further comprising:
varying the frequency of the control signal within a designated frequency range, when the amount of transmission power is equal to or less than the designated threshold power amount.

16. The wireless charging method of claim 15, further comprising:
decreasing or increasing the frequency of the control signal around the designated frequency in the designated frequency range.

17. The wireless charging method of claim 15, further comprising:
determining at least one of the phase and a duty cycle of the control signal based at least in part on the amount of transmission power and the varied frequency.

18. The wireless charging method of claim 10, wherein the wireless charging method uses electromagnetic induction, magnetic resonance, or electromagnetic waves.

19. An electronic device comprising:
a conductive coil;
a power generation circuit; and
one or more processors operatively connected to the power generation circuit and configured to:
compare an amount of transmission power to be supplied to a power reception device with designated threshold power amount,
varying a frequency of a control signal for controlling the power generation circuit within a designated frequency range when the amount of transmission power is equal to or less than the designated threshold power amount,
determine at least one of a phase and a duty cycle of the control signal based at least in part on the amount of transmission power and/or the varied frequency,
transmit the control signal having at least one of the varied frequency, the determined phase, and the determined duty cycle to the power generation circuit to generate, based at least in part on the control signal, transmission power corresponding to the amount of transmission power, and
wirelessly supply the transmission power generated by the power generation circuit to the power reception device via the conductive coil.

* * * * *